G. L. Morris.

Wood Screw.

N° 55,524. Patented Jun. 12, 1866.

Witnesses,
Samuel N Piper
George Andrews.

Inventor,
George L Morris,
by his attorney,

UNITED STATES PATENT OFFICE.

GEORGE L. MORRIS, OF TAUNTON, MASSACHUSETTS.

IMPROVEMENT IN NICKING SCREW-HEADS.

Specification forming part of Letters Patent No. 55,524, dated June 12, 1866.

*To all whom it may concern:*

Be it known that I, GEORGE L. MORRIS, of Taunton, in the county of Bristol and State of Massachusetts, have invented a new and useful Improvement in Wood-Screws; and I do hereby declare the same to be fully described in the following specification and represented in the accompanying drawings, of which—

Figure 1:
Figure 2:
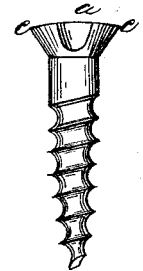

Figure 1 is a top view, and Fig. 2 a side elevation, of a wood-screw made in accordance with my invention.

My invention has special reference to making the head of the screw, or, in other words, to the formation of the head with nicks.

In the common process of nicking the head for reception of the end of a screw-driver a groove is made entirely across the head diametrically thereof, and extending down or nearly down to the root of the head or its junction with the shank of the screw.

In carrying out my improvement I form two nicks or notches, $a\ a$, in the head, and with an interval, $b$, between them. Each of these notches I prefer to make wider as it approaches the circumference of the head. The part $b$ of the head thus serves as a cross-bar to connect the two parts $c\ c$ of the head, which are disconnected when a groove or nick is carried entirely across the head diametrically. Thus the part $b$, left between the nicks, will operate to prevent either portion $c$ of the head from being broken away by the screw-driver, which, for the improved screw, is to have a furcated end, made to fit into the nicks $a\ a$.

By making each nick flaring, as described, the screw-driver may be formed thicker at its edges than at its middle, and thus be rendered stronger where it is most likely to be broken— viz., at or near its end.

I am informed that double-nicked screws have been in use in England before my invention, and therefore make no claim to such; but

What I claim as my invention is—

The improved two-nicked screw, having each of its nicks made so as to increase in width as it approaches the circumference of the head of the screw, the same being substantially as and for the purpose specified.

GEO. L. MORRIS.

Witnesses:
 R. H. EDDY,
 F. P. HALE, Jr.